United States Patent [19]

Stephens

[11] Patent Number: 4,530,524
[45] Date of Patent: Jul. 23, 1985

[54] APPARATUS FOR CLAMPING A HOSE ONTO A COOLANT TUBE

[75] Inventor: Donald L. Stephens, King County, Wash.

[73] Assignee: Paccar Inc., Bellevue, Wash.

[21] Appl. No.: 402,930

[22] Filed: Jul. 29, 1982

[51] Int. Cl.³ .............................................. F16L 55/00
[52] U.S. Cl. ...................................... 285/187; 285/252; 24/274 WB; 24/286
[58] Field of Search ............... 285/252, 253, 187; 24/274 WB, 279, 20 EE, 20 LS, 23 EE, 286

[56] References Cited

U.S. PATENT DOCUMENTS

| | | |
|---|---|---|
| 197,716 | 12/1877 | Caldwell . |
| 808,444 | 12/1905 | Gergersen et al. . |
| 936,627 | 10/1909 | Hill .................................... 285/252 X |
| 1,212,817 | 1/1917 | Russell .............................. 285/253 X |
| 1,843,123 | 2/1932 | Croslen ................................ 285/253 |
| 1,901,088 | 3/1933 | Dick . |
| 2,352,372 | 6/1944 | Colarusso ............................... 24/286 |
| 3,078,109 | 2/1963 | Jackson et al. . |
| 3,174,777 | 3/1965 | Lodholm et al. . |
| 3,526,416 | 9/1970 | Kish ................................ 285/253 X |
| 3,574,355 | 4/1971 | Oetiker . |
| 3,815,940 | 6/1974 | Luckenbill . |
| 3,891,250 | 6/1975 | Oetiker . |

FOREIGN PATENT DOCUMENTS

| | | | |
|---|---|---|---|
| 18772 | 4/1914 | France ............................... 285/253 |
| 63666 | 12/1941 | Norway ............................. 285/253 |
| 1559 | of 1914 | United Kingdom ............... 285/253 |

Primary Examiner—Dave W. Arola
Attorney, Agent, or Firm—Seed and Berry

[57] ABSTRACT

A radially contractible hose clamp is provided with axially spaced serrations having inwardly facing openings and spaced gripping edges symmetrical about a centerline of each opening, with the serrations extending substantially the entire circumference of the clamp.

5 Claims, 11 Drawing Figures

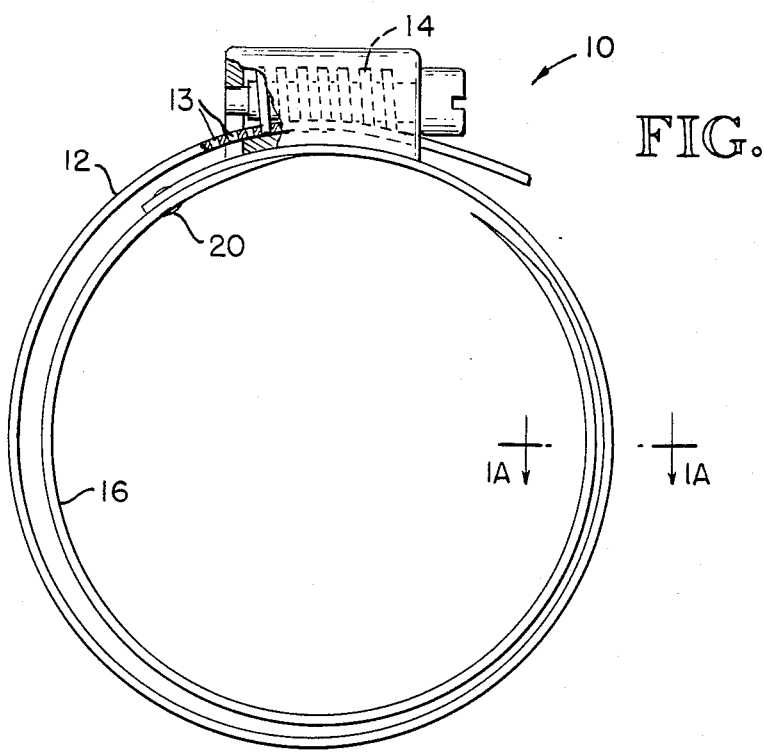
FIG. 1
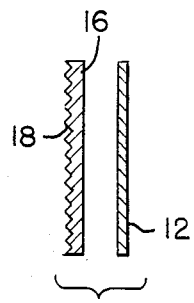
FIG. 1A
FIG. 2
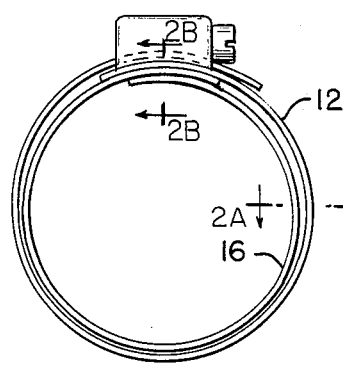
FIG. 2A
FIG. 2B
FIG. 3
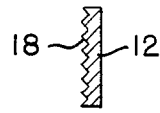
FIG. 3A
FIG. 4    FIG. 5
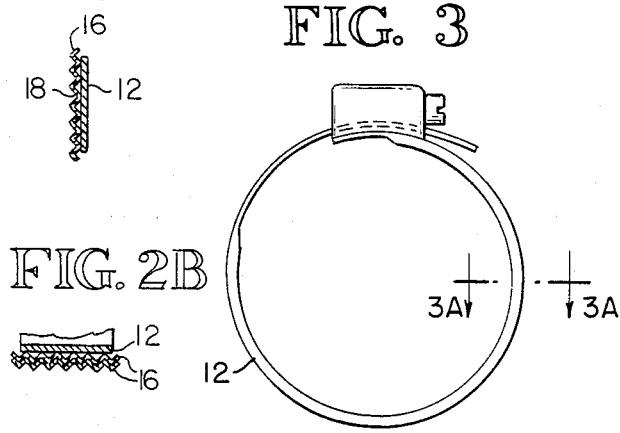

APPARATUS FOR CLAMPING A HOSE ONTO A COOLANT TUBE

TECHNICAL FIELD

This invention pertains to a method and apparatus for reducing leakage between an elastomeric hose and a rigid coolant tube during heating and cooling of the coolant.

BACKGROUND ART

Conventional clamps for holding coolant hoses onto radiator tubes or nipples clamp the hose tightly around the rigid tube.

One type of clamp is a heavy spring wire which is tightened onto the hose and its ends hooked together. A second, more commonly used type of clamp, particularly for large engines used on trucks, is a stainless steel band provided with grooves or serrations that are meshed in a worm gear. By turning the worm gear, the band is circumferentially tightened. The advantage of this type of clamp is that it provides considerably circumferential adjustment.

A frequent problem with both types of clamps is that the large temperature variation between a running temperature of perhaps 200° F. and freezing temperatures will cause the hose, tube and clamp to expand. Since the coefficient of expansion of the rubber or other elastomeric hose is about fifty times greater than that for the steel band, the rubber tends to be extruded out from beneath the steel band. Then, during cooling, particularly in winter temperatures down to 0° F., the rubber contracts away from the tube, allowing the engine coolant to leak out of the coolant system. Not only does this result in the loss of expensive antifreeze, but if not detected, the loss of the coolant can ruin an engine in a very few seconds at its high operating temperature. When leakage is detected, the operator frequently tightens up on the adjustable type of clamp to stop the leakage. However, during the next cycle of thermal expansion and contraction, leakage may again occur. The cause of this problem is believed to be that the rubber, when it expands from beneath the steel band, loses its resiliency and ability to maintain tension on the clamp and thus seal off around the tube. Retightening of the clamp provides temporary correction but does not prevent subsequent thermal cycling from again producing leakage.

DISCLOSURE OF THE INVENTION

It is an object of this invention to provide a clamping assembly which reduces the chance for leakage between a coolant hose and the rigid coolant tube.

It is another object of this invention to provide a method and apparatus for allowing expansion of the elastomeric coolant hose within the confines of the steel clamp assembly so as to maintain the inherent resiliency of the elastomeric hose during thermal expansion and contraction. Basically, the apparatus objects are obtained by providing some means between the clamping surface and the rigid tube to restrict axial movement of the hose during thermal expansion but to allow radial expansion of the hose during thermal expansion. Preferably, this involves a plurality of circumferentially aligned, axially spaced serrations, either in the steel band of the clamp or on a separate strip which may be loose within the steel band or attached to the steel band. The serrations preferably extend substantially the full axial width of the band and substantially the full circumferential length of the band. The serrations should be several in number and preferably are symmetrically shaped about a center line of each of the serrations or grooves, but unsymmetrical grooves may provide superior resistance to the tendency of the hose material to expand from under the clamp. The serrations or grooves should be closed at the ends opposite the opening of the groove, and the opening should be facing or opposed to the elastomeric hose. Preferably, V-shaped symmetrical serrations should be employed, but U-shaped serrations or similar shapes may also be suitable. The openings of the serrations should be sufficiently great in depth such that the rubber does not radially expand to fill the serration opening during normal clamping pressures at room temperature (70° F.). This will leave room for radial expansion at the higher operating temperatures. There should not be only one or two large serrations as it is desirable to provide numerous small openings for the rubber to expand into, all within the confines of the clamp. Some expansion of the rubber will extrude out from under the clamp; but if sufficient serrations are provided within the confines of the plant, the rubber tends to retain its resiliency to maintain a tension on the clamp, and thus sealing pressure on the tube during cool periods. While the serrations need not go completely and continuously around the clamp, they should substantially, circumferentially encircle the clamp so that the rubber retains its resiliency substantially about its entire circumference.

Similarly, the method of this invention is to essentially allow expansion of the rubber within the confines of the axial width of the clamp and to simultaneously restrain axial movement of the rubber from under the clamp; then, to undergo thermal expansion and contraction of the tube, rubber and clamp, and, if necessary, retighten after one cycle of thermal expansion and contraction.

BRIEF DESCRIPTION OF THE DRAWINGS

FIG. 1 is a side elevation of one embodiment of the invention.

FIG. 1A is a section taken along the line 1A—1A of FIG. 1.

FIG. 2 is a side elevation of a second embodiment.

FIGS. 2A and 2B are sections along lines 2A—2A and 2B—2B of FIG. 2.

FIG. 3 is a side elevation of a third embodiment.

FIG. 3A is a section taken along the line 3A—3A of FIG. 3.

FIG. 4 is an operational schematic section of a preferred embodiment of the invention.

FIG. 5 is an operational schematic section of another embodiment of the invention.

BEST MODE FOR CARRYING OUT THE INVENTION

Figure 6:
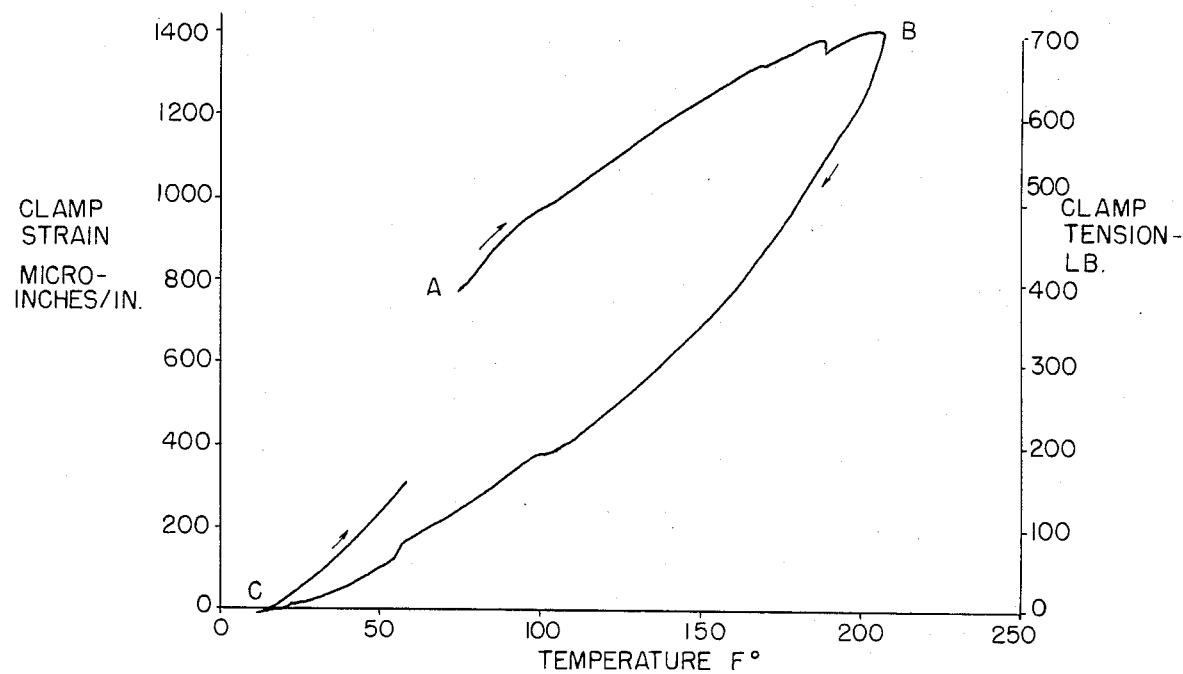
FIG. 6 is a graph showing a plot of a prior art "clamp tension versus temperature" graph.

As best shown in FIGS. 1 and 1A, a conventional clamp 10 has a conventional steel band 12 having grooves 13 which mesh with a worm gear 14 in a well-known manner. By rotating the worm gear 14, the band can be circumferentially tightened or contracted so that its diameter becomes smaller.

In the embodiment illustrated in FIGS. 1 and 1A, a separate metallic strip 16 is provided with circumferential grooves or serrations 18. Preferably, these serrations are symmetrical about a center line through the opening of each serration rather than being saw-toothed. Otherwise, the serrations may be U-shaped, but should generally have a sufficiently abrupt or sharp edge as to provide a gripping edge while allowing expansion of the rubber up into the opening of the serration. The serration opening should be of a sufficient depth such that when the band is tightened under its normal loading, such as 400 pounds tension on the clamp at 70° F., there will still be voids between the rubber and the closed end of the opening, allowing for thermal expansion of the rubber into the opening. The strip is connected to the free end of the band by spot welding or riveting, as indicated by reference numeral 20.

FIG. 2 illustrates a band 12, with the strip 16 being freely mounted within the band 12. The same serrations as in FIG. 1A may be provided in this strip, or, in the alternative, the serrations can be double-sided, creating a nested overlap, as shown in FIG. 2B.

FIG. 3 illustrates a band 12 in which the serrations 18 are made within the band 12 itself rather than on a separate strip.

FIG. 4 illustrates an elastomeric rubber hose 26 held onto a rigid coolant tube 28 by the clamp 10.

FIG. 5 is a similar illustration, but with the exterior surface of the tube 28 also serrated as at 29 to provide additional gripping surfaces and expansion openings for the tube. The embodiment of FIG. 4 is the preferred embodiment. In both FIGS. 4 and 5, the rubber is shown filling the serration openings as at operating temperature.

Figure 7:
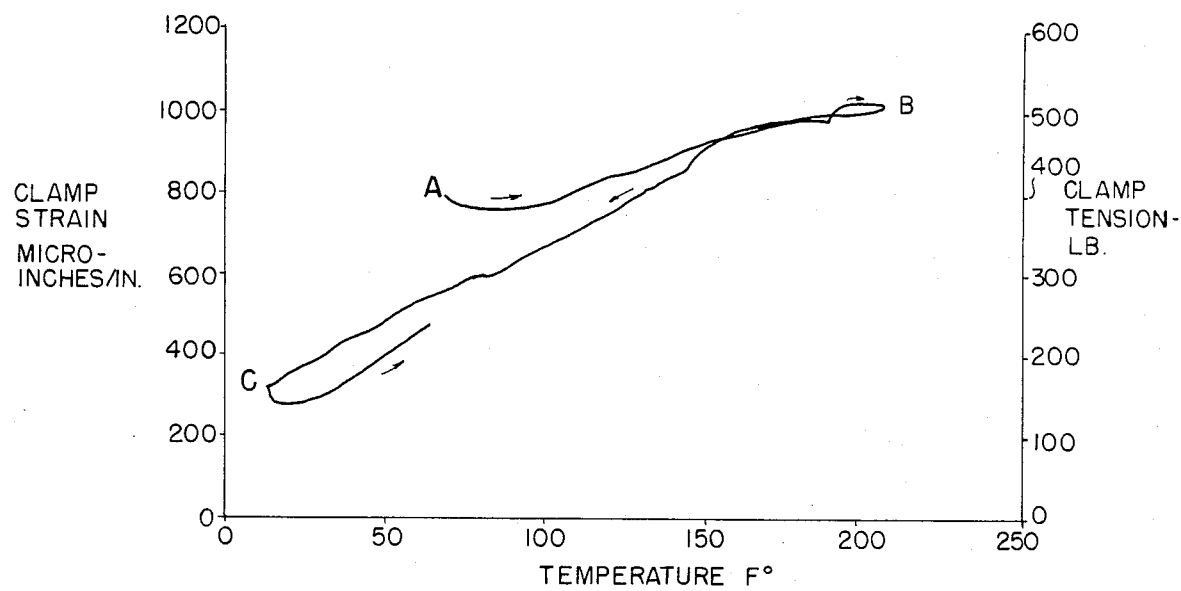
FIG. 7 is a graph of a plot of "clamp tension versus temperature" using the principles of this invention.

FIG. 6 illustrates a plot of clamp tension versus temperature for a conventional, prior-art-type clamp. FIG. 7 illustrates a plot of clamp tension versus temperature for a serrated ring-type clamp embodying the principles of the invention. These two plots were taken from laboratory testing when the entire assembly was placed in an oven to heat the assembly of tube, hose and clamp, and then cooled in a refrigerator to reach the lower temperatures.

From point A to point B in each of the plots, the entire assembly is heated. The prior art plain clamp tension rises more because the hose is partially "trapped" by the smooth clamp surface, and it "escapes" from under the clamp by extruding in both directions axially. The serrated clamp tension rises less because the voids in the serration provide a volume for the rubber to expand into.

From points B to C, the assembly cools. The tension of the plain clamp falls rapidly as temperature is decreased because there is less rubber under the clamp than before. The tension of the serrated ring clamp retraces its path, falling only slightly, and then falls at a low rate because the escape of the rubber has been largely prevented.

The net result is that at point C, the plain clamp has lost its tension entirely, while the serrated ring clamp retains a substantial portion of its initial tension.

The two sketches illustrate the principle of operation and are not intended to be representative of actual operating conditions.

Thus the method of the invention is to fit the elastomeric hose over the rigid tube, then fit a circumferentially contractible clamp around the hose and tube, then tightening the clamp on the hose, heating and cooling the hose and clamp, allowing the hose to expand radially within the axial confines of the clamp while restraining axial movement of the hose from under the clamp, whereby the hose will retain its resiliency so as to maintain tension on the clamp when the hose and clamp are cooled. It is understood, of course, that in some extreme temperature fluctuations, one or more retightenings of the clamp may occur, but the advantages of the unique method of this invention will provide more tension in the clamp after tightening and after additional repeated temperature fluctuations than with a plain, smooth type of clamp.

While the preferred embodiments of the invention have been illustrated and described, it should be understood that variations will be apparent to one skill in the art without departing from the principles herein. Accordingly, the invention is not to be limited to the specific embodiments illustrated in the drawing.

I claim:

1. A hose clamp assembly for retaining a resilient elastomeric hose onto a rigid tube connected to a coolant system or the like, comprising:

flexible circumferentially contractible band means;

means for tightening the band means for reducing its circumference, said hose being adapted to be fitted between the band means and the tube; and means operatively associated with the band means for restraining expansion of the hose axially of the band means and for allowing limited radial expansion of the hose within the axial confines of the band means, said hose expansion restraining means including a plurality of serrations axially spaced along substantially the entire axial width of the band means and extending substantially around the entire circumference of the band means, said serrations each including an opening facing the hose and having spaced gripping edges engaging the hose, said opening of said serrations having widths and depth defining opening volumes larger than the volumes of elastomeric hose within the edges of the serrations engaging the hose at normal room temperatures so that upon elevation of the temperatures the elastomeric hose can expand radially into the openings rather than be limited only to axial expansion out from the band means, whereby repeated expansion and extraction of the hose will result in residual resiliency remaining in the hose to maintain a tension in said band means and reduce leakage of coolant from between said hose and said tube.

2. The clamp assembly of claim 1, said band means including an elongated metal band, said means for tightening the band means including grooves spaced along the length of the band and a worm gear rotatably mounted and engaged with said grooves for tightening the band in response to rotation of the worm.

3. The clamp assembly of claim 2, said band means including an inner strip between the band and the hose having circumferentially spaced ends, said serrations being axially spaced along the strip and extending substantially the full circumferential length of the strip.

4. The clamp assembly of claim 3, said strip being fixed to said band.

5. The clamp assembly of claim 3, said strip ends overlapping, said strip having said serrations on opposite faces, said serrations on opposite faces of the strip extending along the overlapping ends.

* * * * *